(12) United States Patent
Lynch et al.

(10) Patent No.: US 8,705,363 B2
(45) Date of Patent: Apr. 22, 2014

(54) PACKET SCHEDULING METHOD AND APPARATUS

(75) Inventors: Timothy Lynch, San Francisco, CA (US); Peter Lam, Port Moody (CA)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 372 days.

(21) Appl. No.: 13/080,574

(22) Filed: Apr. 5, 2011

(65) Prior Publication Data

US 2012/0257500 A1    Oct. 11, 2012

(51) Int. Cl.
*H04L 12/56* (2006.01)
(52) U.S. Cl.
USPC ............ 370/235; 370/389; 370/412; 370/400
(58) Field of Classification Search
None
See application file for complete search history.

(56) References Cited

U.S. PATENT DOCUMENTS

| | | | |
|---|---|---|---|
| 6,834,053 B1 | 12/2004 | Stacey et al. | |
| 7,760,747 B2 * | 7/2010 | Dally et al. | 370/412 |
| 7,830,889 B1 | 11/2010 | Lemaire et al. | |
| 7,969,884 B1 * | 6/2011 | Venables et al. | 370/235 |
| 8,194,690 B1 * | 6/2012 | Steele et al. | 370/412 |
| 8,437,355 B1 * | 5/2013 | Goodson | 370/395.4 |
| 8,443,066 B1 * | 5/2013 | Saraiya et al. | 709/222 |
| 2005/0047425 A1 * | 3/2005 | Liu et al. | 370/411 |
| 2007/0070895 A1 * | 3/2007 | Narvaez | 370/230 |
| 2009/0279550 A1 * | 11/2009 | Romrell et al. | 370/395.4 |
| 2012/0063313 A1 * | 3/2012 | Zhou et al. | 370/235 |

OTHER PUBLICATIONS

Jiwasurat S et al: "Hierarchical shaped deficit round-robin scheduling," Global Telecommunications Conference, 2005. GLOBECOM '05. IEEE St. Louis, MO, USA Nov. 28-Dec. 2, 2005, Piscataway, NJ, USA, IEEE, vol. 2, Nov. 28, 2005, pp. 688-693, XP010879183, DOI: 10.1109/GLOCOM.2005.1577729, ISBN: 978-0-7803-9414-8, section III, Figure 2.

* cited by examiner

*Primary Examiner* — Hassan Kizou
*Assistant Examiner* — Amy Ling

(57) ABSTRACT

Improved packet scheduling methods and apparatuses for use in, among other things, a network interface of a router (or other network element) are described herein. In one such improved method, packets buffered in a network interface are segmented for transmission on a communications link into multiple scheduling domains each being represented by a scheduling tree, each scheduling tree is assigned to a separate virtual port scheduling engine, and a top level scheduling engine is employed to schedule between the outputs of the virtual port scheduling engines to make the final choice of which buffered packet to transmit on the communications link (e.g., to move to the transmit queue of the network interface). By having the virtual port scheduling engines operate in parallel and substantially independently of each other, the rate at which packet can be moved into the transmit queue may increase greatly, thereby increasing the bandwidth of the network interface of the router.

21 Claims, 14 Drawing Sheets

PACKET SCHEDULING METHOD AND APPARATUS

TECHNICAL FIELD

The invention relates to packet scheduling. As used herein, the term "packet" is used broadly to encompass, for example, any unit of data at any layer of the OSI model (e.g., network layer, transport layer, data physical communications link layer, application layer, etc.).

BACKGROUND

Packet scheduling is necessary when multiple packets compete for a common outgoing communications link (e.g., a physical communications link or a pseudo-wire). This scenario occurs commonly in routers (and other network elements). At its most simplest, a router connects a first network with a second network. That is, there is a first physical communications link that connects a first network interface of the router to the first network and a second physical communications link that connects a second network interface of the router to the second network, thereby enabling the router to route packets between the two networks. The router may receive from the first network via the first physical communications link packets destined for a node in the second network. At certain points in time, the rate at which these packets arrive at the router may exceed the rate at which the router can transmit packets onto the second physical communications link (e.g., the second physical communications link may have a lower bandwidth than the first physical communication link). Thus, the router may employ packet queues to temporarily store the received packets. Thus, at any given point in time, it is likely that the router is storing multiple packets in its packet queues that were received from the first network and destined for the second network. As there may be a single physical communications link connecting the router to the second network, the queued packets all "compete" for this common outgoing physical communications link. As such, the router requires some method of packet scheduling. That is, the router needs some way to select which of the queued packets will be next in line for outgoing transmission.

One packet scheduling technique involves (a) creating a scheduling tree having a root scheduling node, a set of leaf scheduling nodes and zero or more aggregate scheduling nodes, where each leaf scheduling node is associated with a packet queue, and (b) employing a scheduling engine to, on a continuous basis, traverse the scheduling tree to arrive at a leaf scheduling node and to move a packet from the packet queue associated with the leaf scheduling node to a transmit queue. A problem with this technique is that the performance of the scheduling engine may be limited due to, among other things, memory bandwidth limitations and contention overhead for accessing and updating the shared state information of each scheduling node.

What is desired, therefore, is an improved packet scheduling process.

SUMMARY

Methods and apparatuses for improving packet scheduling in a network interface of a router (or other network element) are described herein. One method is to segment packets buffered in the network interface for transmission (e.g., for transmission on a physical communications link or port pseudo-wire or Link Aggregation Group (LAG)) into multiple scheduling domains, where each scheduling domain is represented by a scheduling tree, assign each scheduling tree to a separate virtual port scheduling engine, and employ a top level scheduling engine to schedule between the outputs of the virtual port scheduling engines to make the final choice of which buffered packet to transmit (e.g., to move to a transmit queue of the network interface).

Having the virtual port scheduling engines operate in parallel and substantially independently of each other reduces greatly the amount of shared state that must be considered for each individual scheduling decision. Consequently, with this technique, the rate at which packets can be moved into the transmit queue may increase substantially. Thus, if the network interface is connected to a high-speed communications link (e.g., 100 Gigabits per second (Gbps) physical communications link), then the ability of the scheduling system to operate fast enough to utilize the full bandwidth of the communications link is enhanced.

Accordingly, in one aspect, a packet scheduling apparatus is provided. In some embodiments, the packet scheduling apparatus includes: a first scheduling engine (e.g. a first virtual port scheduling engine); a second scheduling engine (e.g. a second virtual port scheduling engine); and a third scheduling engine (e.g., a top level scheduling engine). The first scheduling engine is operable to (a) select a packet queue from a first set of packet queues and (b) move a packet from the selected packet queue to an intermediate packet queue included in a first set of intermediate packet queues. The first scheduling engine may be configured to perform the packet queue selection using information corresponding to a first set of scheduling nodes (e.g., a hierarchically arranged set of scheduling nodes that forms a scheduling tree).

Like the first scheduling engine, the second scheduling engine is operable to (a) select a packet queue from a second set of packet queues and (b) move a packet from the selected packet queue to an intermediate packet queue included in a second set of intermediate packet queues. The second scheduling engine may be configured to perform the packet queue selection using information corresponding to a second set of scheduling nodes. In some embodiments, the first scheduling engine and the second scheduling engine are configured to select packet queues independently of each other such that state information need not be shared between the first and second scheduling engines. The third scheduling engine is operable to (a) select a packet queue from a set of packet queues that includes the first set of intermediate packet queues and the second set of intermediate packet queues and (b) move a packet from the selected packet queue to a transmit queue.

In some embodiment, the packet scheduling apparatus may be implemented in a network interface and also includes a packet transmitter configured to transmit on to a communications link packets from the transmit queue.

In some embodiments, the first and second scheduling engines are software based scheduling engines comprising a computer readable medium having computer code stored therein loaded into, and executed by, a processor and the third scheduling engine is a pure hardware based scheduling engine that is implemented using an application specific integrated circuit (ASIC).

In some embodiments, a set of packet queues included in the first set of packet queues is associated with a first packet flow, a set of packet queues included in the second set of packet queues is associated with a second packet flow, and the packet scheduling apparatus further includes a packet receiving and processing unit (PRPU) configured to (a) receive a packet, (b) determine a packet flow to which the packet belongs, and (c) place the packet in an egress packet queue associated with the packet flow. The PRPU may be software based (e.g., the PRPU may include a computer readable medium having computer code stored therein loaded into, and executed by, a processor) or hardware based (e.g., the PRPU may be implemented using an application specific integrated circuit (ASIC)).

In some embodiments, the third scheduling engine is operable to select a packet queue from a set of packet queues comprising the first set of intermediate packet queues, the second set of intermediate packet queues, and a third set of packet queues, where a set of packet queues included in the third set of packet queues is associated with a third packet flow. In such embodiments, the PRPU is configured such that (a) when the PRPU receives a packet and determines that the packet belongs to the first packet flow, the PRPU places the packet in one of the packet queues included in the set of packet queues that is associated with the first packet flow, (b) when the PRPU receives a packet and determines that the packet belongs to the second packet flow, the PRPU places the packet in one of the packet queues included in the set of packet queues that is associated with the second packet flow, and (c) when the PRPU receives a packet and determines that the packet belongs to the third packet flow, the PRPU places the packet in one of the packet queues included in the set of packet queues that is associated with the third packet flow.

In some embodiments, the first set of scheduling nodes includes scheduling nodes from a first sub-tree of a scheduling tree and the second set of scheduling nodes comprises scheduling nodes from a second, different sub-tree of the scheduling tree. In such embodiments, a configuration module may be configured to examine information defining the scheduling tree, assign to the first scheduling engine a first sub-tree of the scheduling tree, and assign to the second scheduling engine a second, different sub-tree of the scheduling tree.

In some embodiments, the first set of scheduling nodes includes a set of scheduling nodes that are also included in the second set of scheduling nodes.

In some embodiments, the information that corresponds to the first set of scheduling nodes comprises: (a) first maximum data rate information associated with one of the scheduling nodes included in the first set of scheduling nodes and (b) information identifying a first scheduling algorithm, and the information that corresponds to the second set of scheduling nodes comprises: (a) second maximum data rate information associated with one of the scheduling nodes included in the second set of scheduling nodes and (b) information identifying a second scheduling algorithm.

In some embodiments, the first scheduling engine is configured to select a packet queue from which to remove a packet using the first maximum data rate information and the first scheduling algorithm, and the second scheduling engine is configured to select a packet queue from which to remove a packet using the second maximum data rate information and the second scheduling algorithm.

In some embodiments, the first scheduling engine includes: a data processing system; and a computer readable medium accessible to the data processing system. The computer readable medium may store computer readable program code that when executed by the data processing system cause the data processing system to (a) select a packet queue from the first set of packet queues and (b) move a packet from the selected packet queue to an intermediate packet queue included in the first set of intermediate packet queues.

In another aspect, a packet scheduling method is provided. In some embodiments, the packet scheduling method includes the following steps: assigning a first set of packet queues to a first scheduling engine; assigning a second set of packet queues to a second scheduling engine; assigning a first packet flow to a set of packet queues included in the first set of packet queues; assigning a second packet flow to a set of packet queues included in the second set of packet queues; receiving, at a network interface of a network element, a packet; determining a packet flow to which the packet belongs; if the received packet belongs to the first packet flow, then placing the received packet in one of the packet queues included in the set of packet queues to which the first packet flow is assigned in response to determining that the received packet belongs to the first packet flow; and if the received packet belongs to the second packet flow, then placing the received packet in one of the packet queues included in the set of packet queues to which the second packet flow is assigned in response to determining that the received packet belongs to the second packet flow.

In some embodiments, the first scheduling engine (a) selects a packet queue from the first set of packet queues and (b) moves a packet from the selected packet queue to an intermediate packet queue included in a first set of intermediate packet queues, the second scheduling engine (a) selects a packet queue from the second set of packet queues and (b) moves a packet from the selected packet queue to an intermediate packet queue included in a second set of intermediate packet queues, and a third scheduling engine (a) selects a packet queue from a set of packet queues comprising the first set of intermediate packet queues and the second set of intermediate packet queues and (b) moves a packet from the selected packet queue to a transmit queue. A packet transmitter of the network interface is configured to transmit on to a communications link packets from the transmit queue.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

DETAILED DESCRIPTION

As used herein the indefinite articles "a" and "an" mean "one or more."

Figure 1:
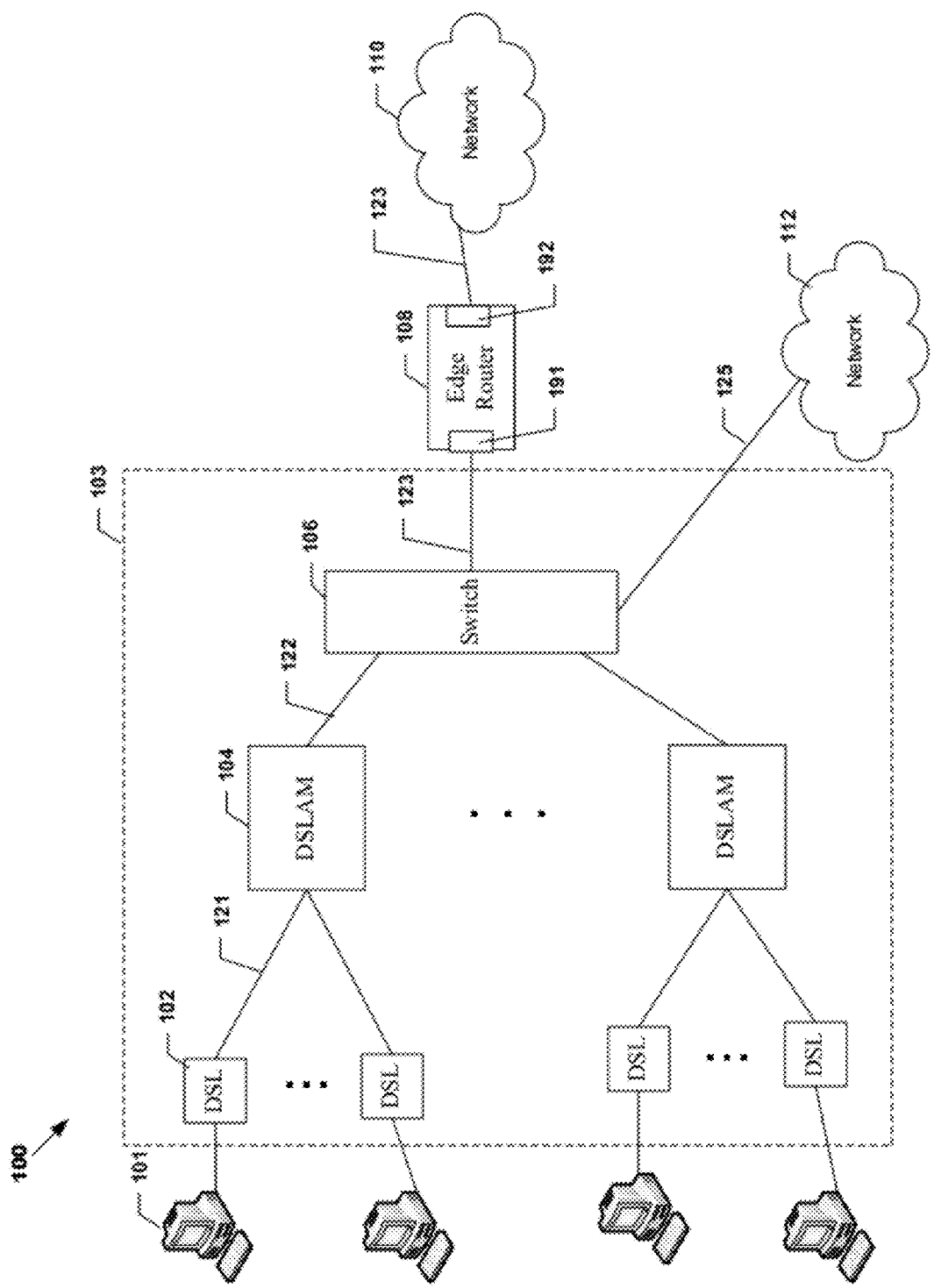
FIG. 1 illustrates a communication system comprising an edge router.

FIG. 1 illustrates an example communication system 100 in which embodiments of the invention may be employed. The invention, however, is not limited to any particular type of communication system. In the illustrated example, communication system 100 includes a number of end user devices 101 transmitting packets to and receiving packets from a network 110 (e.g., the Internet). As shown in FIG. 1, user devices 101 communicate with network 110 (e.g., servers within network 110) via an access network 103 and a network element 108 (e.g., an edge router 108) that functions to connect the access network 103 with network 110.

In the example shown, access network 103 is a digital subscriber line (DSL) access network 103, but any type of access network 103 may be used. The example DSL access network 103 includes DSL modems 102 connected to DSL access multiplexers (DSLAMs) 104, connected to a switch 106 via physical communications link 122. For example, DSL modem 102 is connected via a physical communications link 121 with DSLAM 104, which is connected via a physical communications link 122 with switch 106. Switch 106 is connected via a physical communications link 123 (which may be wired or wireless) with a network interface 191 of network element 108. Similarly, network 110 is connected via a physical communications link 124 with a network interface 192 of edge router 108. Network interfaces 191 and 192 may be connected by a backplane component (not shown) of network element 108. Also connected to switch 106 may be another network 112.

Figure 2:
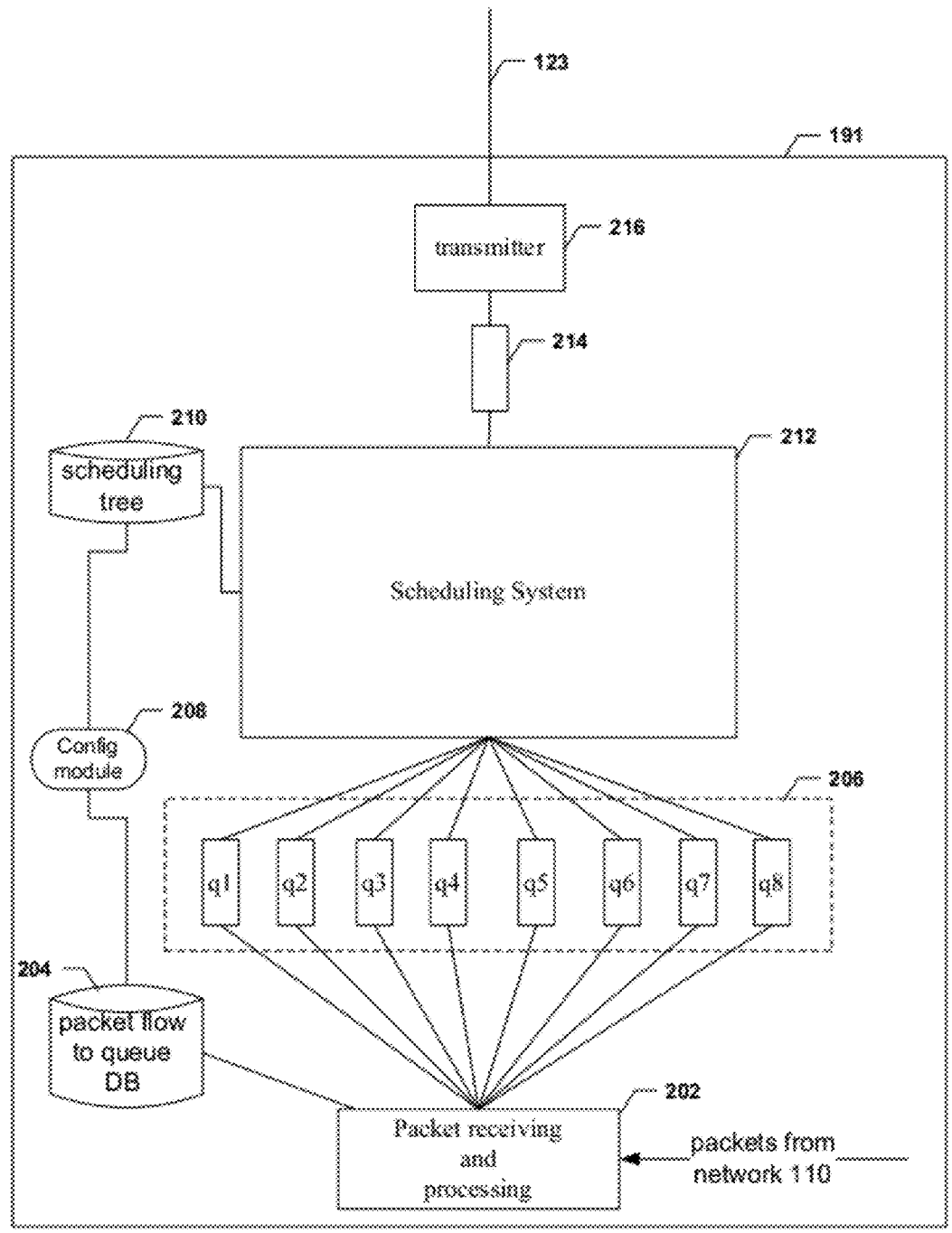
FIG. 2 is a functional diagram of a network interface of the edge router.

FIG. 2 is a functional diagram of a packet egress portion of network interface 191 of network element 108. As illustrated in FIG. 2, network interface 191 includes a packet receiving and processing unit (PRPU) 202. In the embodiment shown in FIG. 1, PRPU 202 receives packets from network interface 192 via, for example, a backplane of network element 108. The packets received from network interface 192 include packets that network interface 192 receives from network 110. In addition to providing packets to PRPU 202, network interface 192 may, for each packet that it provides to PRPU 202, also provide meta-data for the packet.

In one embodiment, each packet received by PRPU 202 belongs to a single packet flow. In this embodiment, for each packet received by PRPU 202, PRPU 202 functions to determine the packet flow to which the received packet belongs. In some embodiments, PRPU 202 determines the packet flow to which a received packet belongs by examining data included in a packet header included in the packet or by examining meta-data for the packet, if any. For instance, the packet header (or meta-data) may include one or more virtual local area network (VLAN) tags (e.g., an outer VLAN tag and an inner VLAN tag) and may also include information identifying the type of payload data the packet is carrying (e.g., real-time data, such as voice-over IP data, or non-real time data, such as HTTP messages). As a specific example, all packets associated with a certain outer VLAN tag, inner VLAN tag, and payload type are determined to belong to the same flow, whereas all packets associated with a different outer VLAN tag, inner VLAN tag, or payload type are determined to belong to a different packet flow.

PRPU 202 also functions to add the received packet to a packet queue based on the determined packet flow to which the packet belongs. That is, in some embodiments, each packet flow is associated with a packet queue. For instance, network interface 191 may include a packet flow to packet queue database (DB), which may be implemented in, for example, a computer readable medium into which data is written and read, that stores information that maps each one of a set of defined packet flows to a packet queue. As shown in FIG. 2, network interface 191 includes a set of packet queues 206 (e.g., packet queues q1-q8, as shown).

For example, if it is assumed that all packets received by PRPU 202 and destined for network 112 belong to the same packet flow, then this packet flow may be associated with, for example, q8. Thus, in this example, when PRPU 202 receives from network interface 192 a packet destined for network 112 (or meta-data for the packet—e.g., a packet identifier, a memory location identifier identifying the memory location where the packet is stored, destination address information), PRPU 202 will "add" the packet to q8. The packet queues in packet queue set 206 do not need to be physical packet queues in the sense that all packets in a packet queue are located in sequence in the same storage device. Rather, the packet queues described herein may be logical packet queues, such as logical first-in-first-out (FIFO) packet queues. The packets themselves may be stored anywhere. Thus, "adding" a packet to a packet queue may consist of merely adding to a data structure that implements the packet queue (e.g., a linked list data structure) an identifier uniquely associated with the packet (e.g., an identifier identifying the memory location where the packet is stored).

While PRPU 202 is processing packets (e.g., adding packets to one of the packet queues 206), scheduling system 212 continuously selects one of the packet queues 206 and moves a packet from the selected packet queue to a transmit queue 214. In parallel, packet transmitter 216 continuously removes packets from transmit queue 214 and transmits those packets onto physical communications link 123. In some embodiments, packet transmitter 216 may, prior to transmitting a packet, add a header to the packet, thereby creating a protocol data unit. In this manner, packets flow into and out of the egress portion of network interface 191.

In some embodiments, when it is time for scheduling system 212 to select a packet queue, scheduling system 212 traverses a scheduling tree to determine the packet queue from packet queue set 206 that it should select. Thus, network interface 191 may include a scheduling tree database 210, which may be implemented in a computer readable medium into which data is written and read, for storing information defining the scheduling tree.

Figure 3:
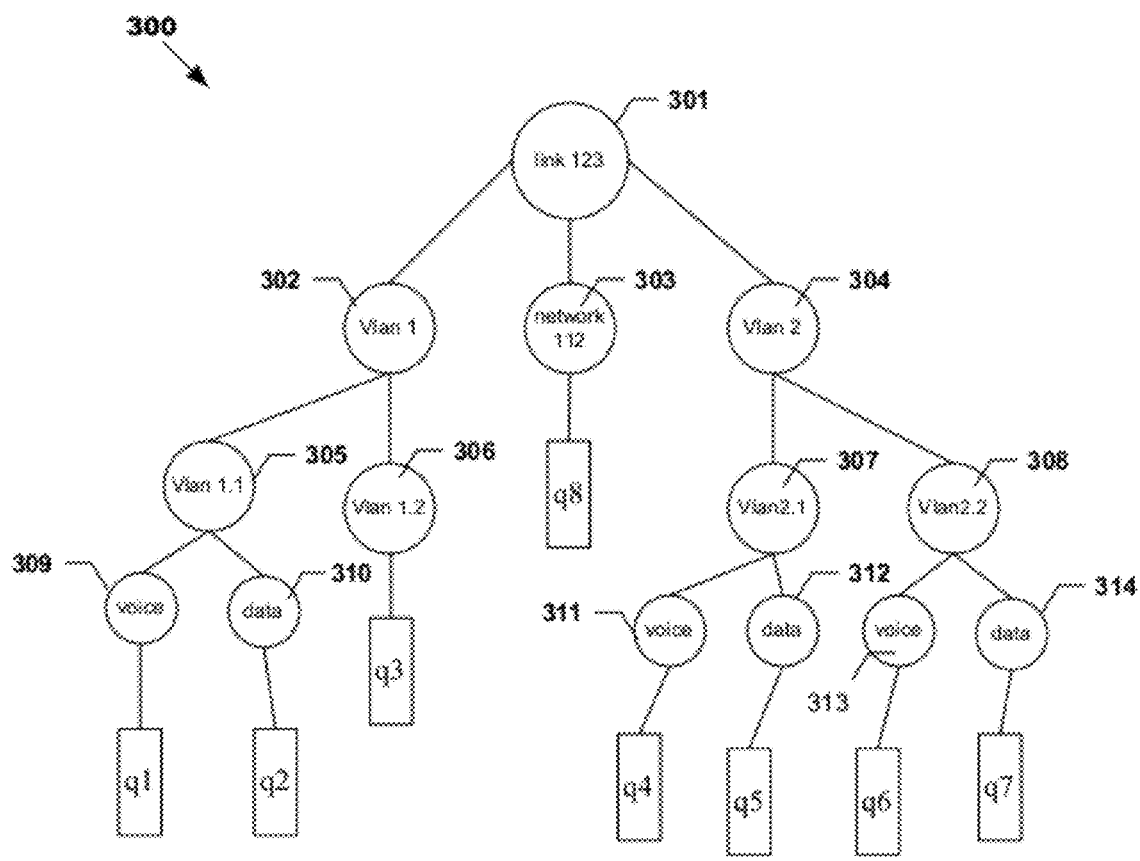
FIG. 3 illustrates an example scheduling tree.

FIG. 3 illustrates an example scheduling tree 300 that may be used by scheduling system 300. Scheduling tree 300 includes a set of scheduling nodes (e.g., scheduling nodes 301-314), each of which may be implemented as a data structure (e.g., a set of data elements that are grouped together) stored in a computer readable medium, that are logically organized in the form of a decision tree. That is, each scheduling node, with the exception of the leaf scheduling nodes, has one or more child scheduling nodes, and each scheduling node, with the exception of the root scheduling node, has a parent. More specifically, scheduling tree 300 includes a root scheduling node 301, aggregate scheduling nodes (e.g., scheduling nodes 302, 304, 305, 307 and 308), and leaf scheduling nodes (e.g., scheduling nodes 303, 306, and 309-314).

In the example shown, each leaf scheduling node and each aggregate scheduling node represents a subset of the packet flows received by PRPU 202 that may be transmitted onto physical communications link 123, and root scheduling node 301 represents all of the packet flows received by PRPU 202 that may be transmitted onto physical communications link 123. Additionally, each leaf scheduling node is associated with a unique packet queue. Thus, scheduling tree 300 illustrates a packet flow to packet queue mapping that may be stored in database 204 and used by PRPU 202, as discussed above.

As a specific example, leaf scheduling node 303 represents the flow of packets to network 112, leaf scheduling node 309 represents the flow of voice packets (packets containing voice data, such as voice-over IP data) destined for VLAN 1.1, leaf scheduling node 310 represents the flow of non-voice packets destined for VLAN 1.1, aggregate scheduling node 305 represents the flow of all packets destined for VLAN 1.1 (i.e., voice and non-voice), and leaf scheduling node 306 represents the flow of all packets destined for VLAN 1.2. In this example, it is assumed that VLAN 1 is associated with DSLAM 104, such that all traffic destined for VLAN 1 is transmitted by switch 106 on physical communications link 122, and VLAN 1.1 is associated with DSL device 102, such that all traffic destined for VLAN 1.1 is transmitted by DSLAM 104 onto physical communications link 121.

As illustrated in FIG. 3, each leaf scheduling node is directly connected to root scheduling node 301 or indirectly connected to root scheduling node 301 through one or more aggregate scheduling nodes. For example, leaf scheduling node 303 is directly connected to root scheduling node 301, whereas leaf scheduling node 311 is connected to root scheduling node 301 through aggregate scheduling nodes 304 and 307. Likewise, each aggregate scheduling node is directly connected to root scheduling node 301 or indirectly connected to root scheduling node 301 through one or more other aggregate scheduling nodes.

As discussed, each scheduling node may be implemented as a data structure stored in a computer readable medium. Thus, in some embodiment, each data structure that implements a scheduling node may include (i) a parent pointer data element that stores a parent scheduling node pointer that points to another data structure that implements another scheduling node (i.e., the scheduling node's parent) and (ii) a set of child pointer data elements, where each child pointer data element stores a child scheduling node pointer that points to another data structure that implements another scheduling node (i.e., one of the scheduling node's children). Thus, each scheduling node relative to another scheduling node may be the parent or the child of that another scheduling node. In the case of a data structure that implements a root node, the parent scheduling node pointer of that data structure may point to NULL because, in some embodiments, by definition, a root node may not have a parent scheduling node. Likewise, in the case of a data structure that implements a leaf node, each child scheduling node pointer of that data structure may point to NULL because, in some embodiments, by definition, a leaf node may not have any child scheduling nodes.

As discussed above, scheduling system 212 may be configured to select a packet queue from which to obtain a packet for delivery to a transmit queue 214 by traversing scheduling tree 300. In some embodiments, scheduling system 212 traverses scheduling tree 300 in a top-down manner (but, in other embodiments, scheduling system may traverse scheduling tree 300 using a bottom-up traversal algorithm) by starting at root scheduling node 301 and then selecting a child scheduling node (e.g., selecting a child pointer data element from the data structure that implements root node 301). In some embodiments, root scheduling node 301 may be associated with a scheduling algorithm (e.g., round-robin). Also, each scheduling node, may be associated with a maximum data rate (and other parameters, such as a minimum target data rate). For example, as discussed above, a data structure may implement a scheduling node, therefore, a scheduling node may be associated with a maximum data rate by storing the maximum data rate in a data element of the data structure that implements the scheduling node.

In such embodiments, scheduling engine 212 selects a child scheduling node of root scheduling node 301 using the scheduling algorithm associated with root scheduling node 301 and the maximum data rates. For example, if it is assumed that (a) the maximum data rate associated with scheduling node 302 is 7 Gbps and (b) the scheduling algorithm associated with root scheduling node 301 indicates that scheduling system 212 should select aggregate scheduling node 302, then scheduling system 212 will select aggregate scheduling node 302, unless, within the last second of time (or other period of time), scheduling system 212 has already selected from the packet queues associated with scheduling node 302 (i.e., packet queues q1, q2 and q3) more than 10 Gb of data, otherwise scheduling system 212 will select one of the other scheduling nodes directly connected to root scheduling node 301 (i.e., scheduling nodes 303 and 304, in this example).

If the selected child scheduling node is a leaf scheduling node, then scheduling system 212 selects the packet queue associated with the selected leaf scheduling node and moves a packet from the selected packet queue to the transmit queue 214. If the selected child scheduling node is a not a leaf scheduling node (i.e., is an aggregate scheduling node), then scheduling system 212 selects a child scheduling node of the selected aggregate scheduling node. This process repeats until scheduling system 212 selects a leaf scheduling node. In this manner, scheduling system 212 traverses scheduling tree 300, considering and enforcing max rates or other scheduling rules at each level and node of the tree.

Like root scheduling node 301, the selected aggregate scheduling node may be associated with a scheduling algorithm, and each child scheduling node of the selected aggregate scheduling node may be associated with a maximum data rate (and/or other parameters). Thus, scheduling system 212 uses the scheduling algorithm and maximum data rates to determine which child scheduling node will be selected. As discussed above, this process repeats until scheduling system 212 selects a scheduling node that is a leaf scheduling node (i.e., a scheduling node that does not have any child scheduling nodes). After selecting a leaf scheduling node and moving to transmit queue 214 a packet from the packet queue associated with the selected leaf scheduling node, scheduling system 212 will once again traverse the scheduling tree 300 starting at root scheduling node 301. Thus, scheduling system 212 continuously traverses the scheduling tree 300 and, thereby, continuously selects a packet queue from which to move a packet to transmit queue 214. In this manner, packets are queued for transmission on physical communications link 123.

As is evident from the above description, scheduling system 212 maintains state information for at least some of the scheduling nodes. For example, if a scheduling node has a maximum data rate associated with it, then scheduling system 212 will keep track of how much data has been selected for transmission from the packet queues associated (directly and indirectly) with the scheduling node. As another example, if a scheduling node is associated with a scheduling algorithm, then scheduling system 212 may maintain state information required to implement the scheduling algorithm (e.g., in the case where the scheduling algorithm of the scheduling node is a round-robin scheduling algorithm, then scheduling system 212 may keep track of which child of the scheduling node had the last "turn"). In some embodiments, scheduling system 212 may store the state information for a scheduling node in one or more data elements of the data structure that implements the scheduling node.

Figure 4:
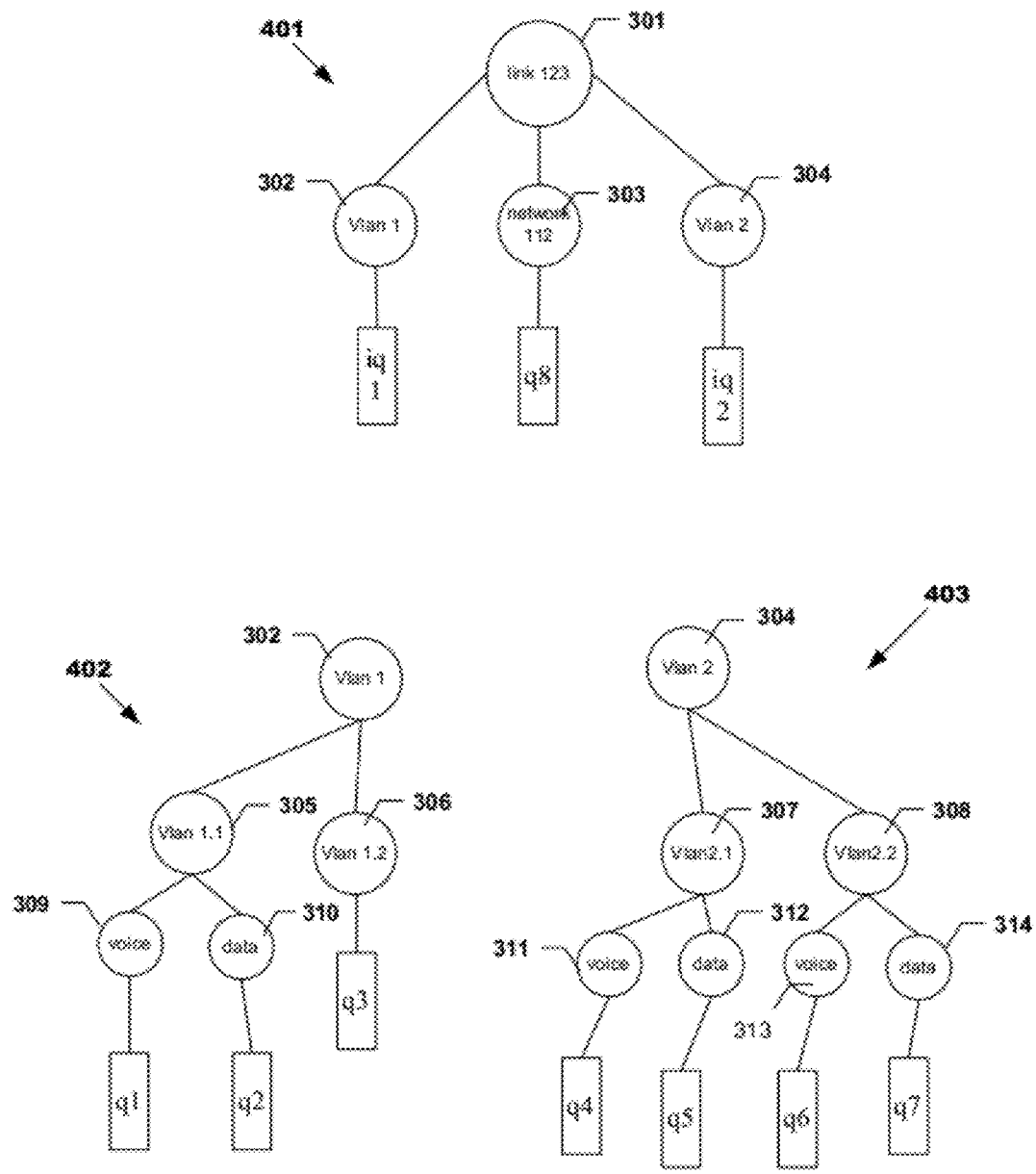
FIG. 4 illustrates one possible way the scheduling tree can be divided into multiple sub-trees.

In situations where the transmission capacity of physical communications link 123 is high (e.g., 100 Gbps), there may be situations where scheduling system 212 is not able to move packets into transmit queue 214 quickly enough such that all of the 100 Gbps capacity is utilized due to the fact that the scheduling tree used by scheduling system 212 has too many decision points. In such situations, multiple new scheduling trees can be formed from the existing scheduling tree. For example, FIG. 4 illustrates how scheduling tree 300 can be divided into three scheduling trees (i.e., trees 401, 402 and 403). In the embodiment shown, each of trees 401-403 is a sub-tree of scheduling tree 300. As further shown, the root scheduling node of tree 401 is the same as the root scheduling node of tree 300, whereas scheduling node 302 is the root scheduling node of tree 402 and scheduling node 304 is the root scheduling node tree 403.

Figure 5:
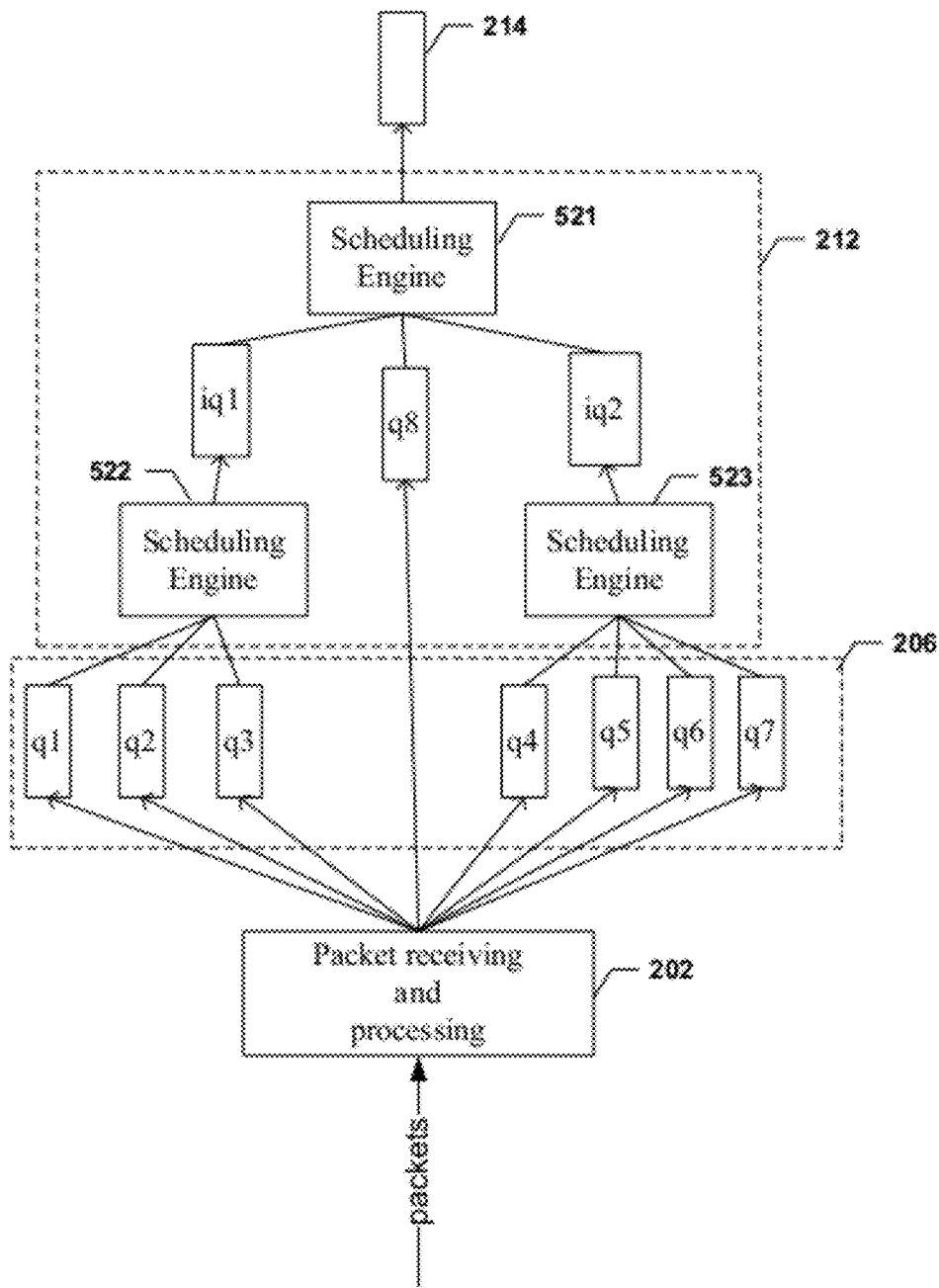
FIG. 5 is a functional diagram of a scheduling system according to one embodiment.

FIG. 5 illustrates a functional diagram of an embodiment of scheduling system 212 that can be used with the scheduling trees 401-403 shown in FIG. 4. In the embodiment shown, scheduling system 212 includes three scheduling engines 521-523, one scheduling engine for each scheduling tree 401-403. Scheduling engine 521 may be classified as a top level scheduling engine because it functions to moves packets to transmit queue 214. Scheduling engines 522 and 523 may be classified as virtual port scheduling engines because the each of the scheduling engines move packets to an intermediate packet queue (e.g., iq1, or iq2), rather than transmit queue 214.

In the example shown, tree 401 is used by scheduling engine 521 to select a packet queue from the packet queue set that consists of iq1, iq2 and q8; tree 402 is used by virtual port scheduling engine 522 to select a packet queue from the packet queue set that consists of q1-q3; and tree 403 is used by virtual port scheduling engine 523 to select a packet queue from the packet queue set that consists of q4-q7. Each scheduling engine 521-523 operates in the same manner as scheduling system 212 described above in connection with tree 300. That is, each scheduling engine 521-523 continually traverses its corresponding scheduling tree; thus each scheduling engine 521-523 continually moves packets from a packet queue selected based on the corresponding tree to transmit queue 214 or to an intermediate packet queue.

More specifically, scheduling engine 521 is configured such that it will move a packet from a selected packet queue to transmit queue 214, whereas scheduling engines 522 and 523 are configured such that each will move a packet from a selected packet queue to an intermediate packet queue (e.g., iq1 and iq2, respectively). Scheduling engines 521, 522, and 523 may be configured to operate in parallel. That is, while scheduling engines 522 and 523 are moving packets in to the intermediate packet queues (iq1 and iq2), scheduling engine 521 may moving packets out of those packet queues and into transmit queue 214. Additionally, scheduling engines 521, 522, and 523 may be configured to operate independently of each other such that any one of scheduling engines does not need any state information maintained by another scheduling engine. In this manner, the rate at which packets are moved into transmit queue 214 can increase greatly. For example, if we assume that at least one of the intermediate packet queues always contains at least one packet, then the rate at which packets are moved into transmit queue 214 is dependent solely on the "bandwidth" of scheduling engine 521 (i.e., the rate at which scheduling engine can transfer packets to transmit queue 214). Moreover, in some embodiments, scheduling engine 521 can be a very simple scheduling engine because its scheduling tree (e.g. tree 401) may only require traversing a single level (e.g., all of the scheduling nodes connected to the root scheduling node 301 are leaf scheduling nodes). Thus, in some embodiments, scheduling engine 521 is implemented substantially purely in hardware so that it will have high bandwidth. For example, in some embodiments, scheduling engine 521 consists (or consists essentially of) an application specific integrated circuit (ASIC), whereas scheduling engines 522 and 523 are software based (e.g., implemented using a general purpose processor having associated therewith a computer readable medium having a computer program stored thereon, such as a program written in an assembly language).

Figure 6:
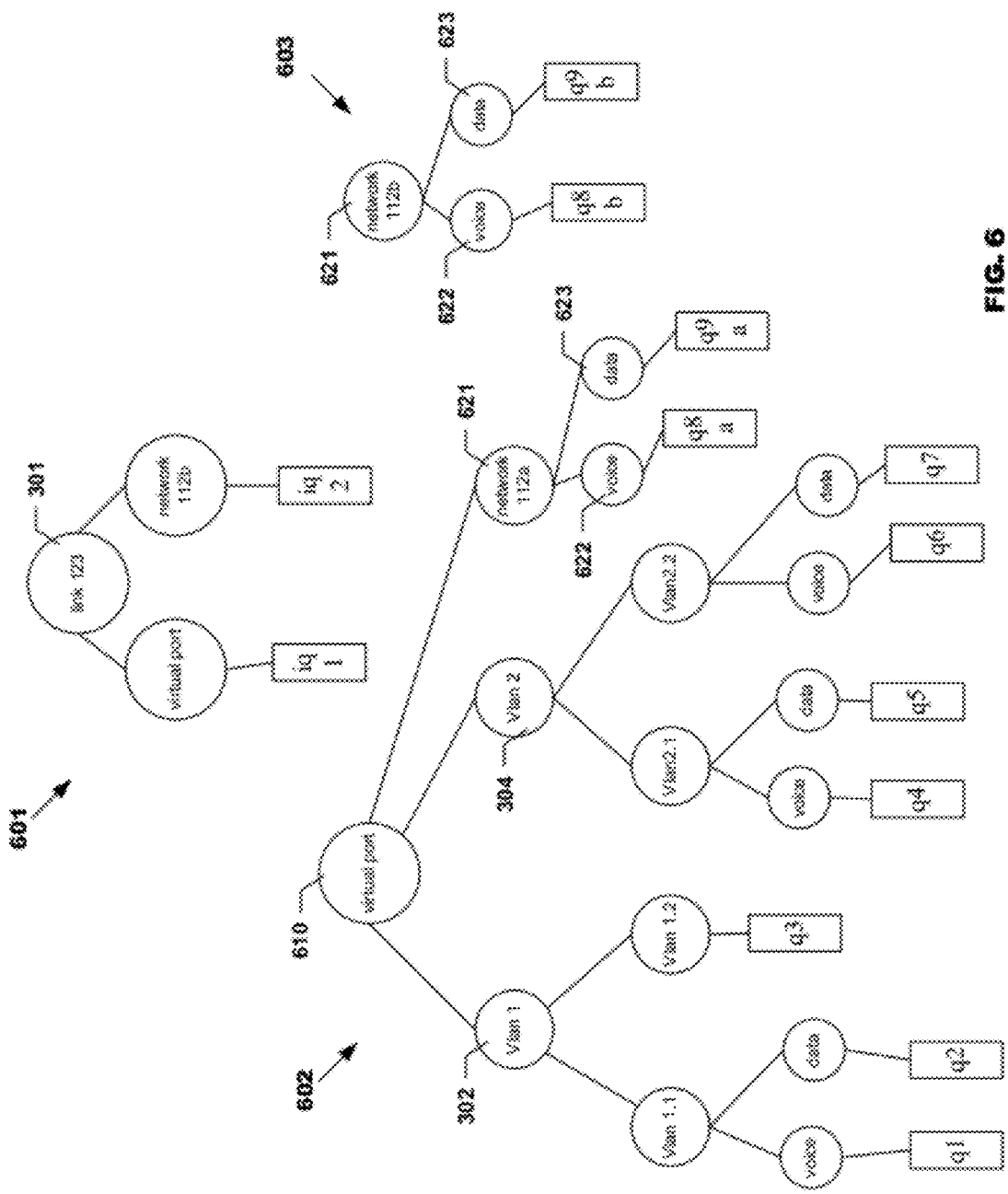
FIG. 6 illustrates another possible way a scheduling tree can be divided into multiple sub-trees.

FIG. 6 illustrates how a different set of operational scheduling trees 601-603 can be formed from the scheduling nodes that make up scheduling tree 300, which may be a conceptual scheduling tree. When multiple scheduling trees are formed from a preexisting scheduling tree, such as tree 300, and one of the new trees includes more than one scheduling node that used to be directly connected to the root scheduling node of the preexisting scheduling tree, then a new root scheduling node will need to be created for that tree. This is shown in FIG. 6. As shown in FIG. 6, a virtual port scheduling node 610 has been created to be the root scheduling node of tree 602. Virtual port scheduling node 610 was needed because tree 602 includes more than one scheduling node that was formally directly connected to root scheduling node 301 (e.g., scheduling nodes 302 and 304). A root scheduling node does not need to be created for tree 603 because this tree includes only a single scheduling node that was previously directly connected to root scheduling node 301. Additionally, in the embodiment shown in FIG. 6, scheduling tree 602 and 603 both include scheduling nodes 621-623, thereby providing a load balancing opportunity, as discussed below. Scheduling nodes 621 represent traffic destined for network 112, scheduling nodes 622 represent voice traffic destined for network 112, and scheduling nodes 623 represent non-voice (i.e., "data") traffic destined for network 112.

Figure 7:
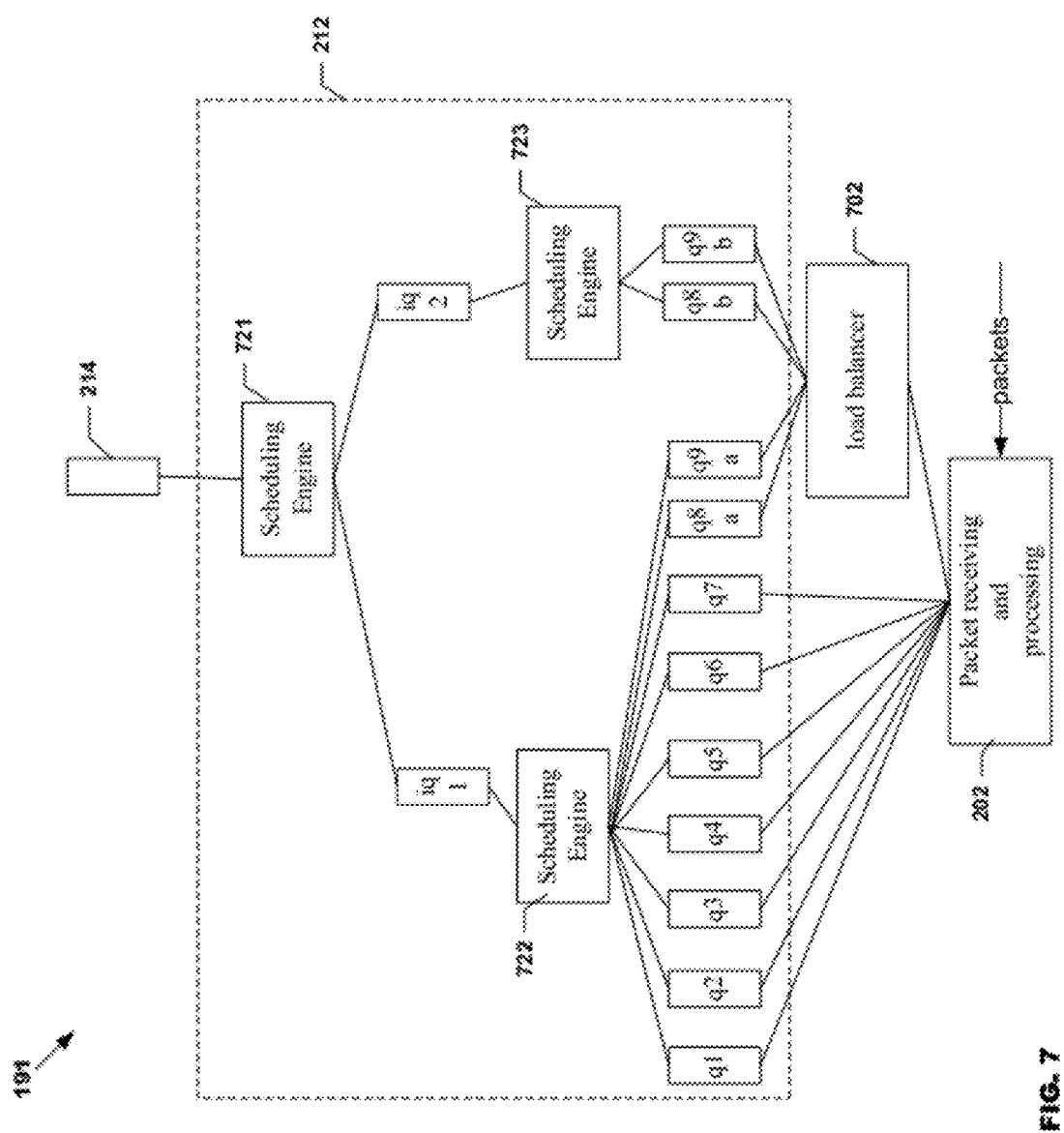
FIG. 7 is a functional diagram of a scheduling system according to another embodiment.

FIG. 7 illustrates a functional diagram of an embodiment of scheduling system 212 that can be used with the scheduling trees 601-603 shown in FIG. 6. In the embodiment shown in FIG. 7, scheduling system 212 includes three scheduling engines 721-723, one scheduling engine for each scheduling tree 601-603. Tree 601 is used by top level scheduling engine 721 to select a packet queue from the packet queue set that consists of iq1 and iq2; tree 602 is used by virtual port scheduling engine 722 to select a packet queue from the packet queue set that consists of q1-q7, q8a and q9a; and tree 403 is used by virtual port scheduling engine 723 to select a packet queue from the packet queue set that consists of q8b and q8b. Each scheduling engine 721-723 continually traverses its corresponding scheduling tree; thus each scheduling engine 721-723 continually moves packets from a packet queue selected based on the corresponding tree to transmit queue 214 or to an intermediate packet queue (e.g., iq1, or iq2). More specifically, top level scheduling engine 721 is configured such that it will move a packet from a selected packet queue to transmit queue 214, whereas virtual port scheduling engines 722 and 723 are configured such that each will move a packet from a selected packet queue to an intermediate packet queue (i.e., iq1 and iq2, respectively). Like scheduling engines 521-523 scheduling engines 721-723 may be configured to operate in parallel and independently of each other.

As further shown in FIG. 7, interface 191 may include a load balancer 702. In the embodiment of FIGS. 6 and 7, when PRPU 202 receives a packet destined for network 112, PRPU 202, instead of immediately placing the packet in a packet queue, passes the packet to load balancer 702, which may distribute the traffic evenly between packet queues q8a,q9a and packet queues q8b,q9b. More specifically, as indicated in FIG. 6, voice traffic destined for network 112 is distributed evenly between packet queues q8a and q8b, and non-voice traffic destined for network 112 is distributed evenly between packet queues q9a and q9b.

Figure 8:
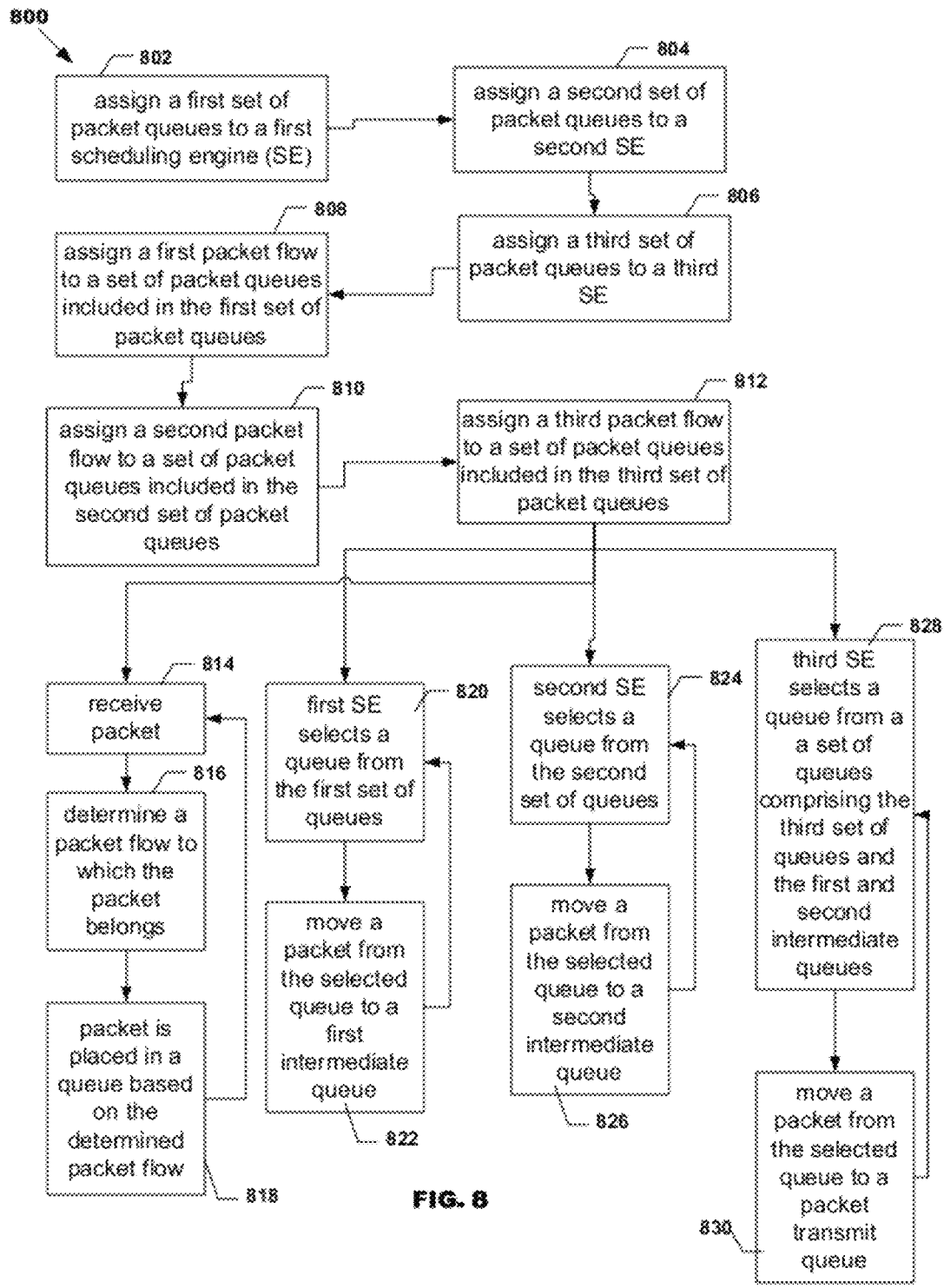
FIG. 8 is a flow chart illustrating various processes according to particular embodiments.

FIG. 8 is a flow chart illustrating a process 800 according to an embodiment. Process 800 may begin in step 802, in which a first set of packet queues (e.g., packet queues q1-q3) is assigned to a first scheduling engine (e.g., scheduling engine 522). Step 802 may be accomplished by assigning a scheduling tree (e.g., scheduling tree 402) to the first scheduling engine, where the scheduling tree is associated with a set of packet queues (see FIG. 4). In step 804, a second set of packet queues (e.g., packet queues q4-q7) is assigned to a second scheduling engine (e.g., scheduling engine 523). Step 804 may be accomplished by assigning a different scheduling tree (e.g., scheduling tree 403) to the second scheduling engine. In step 806, a third set of packet queues (e.g., packet queue q8) is assigned to a third scheduling engine (e.g., scheduling engine 521). In step 808, a first packet flow is assigned to a packet queue included in the first set of packet queues. For example, in step 808 network interface 191 is configured such that all packets destined for network 112 that are received by PRPU 202 will be placed in, for example, q8. In step, 810 a second packet flow is assigned to a packet queue included in the second set of packet queues. In step, 812 a third packet flow is assigned to a packet queue included in the third set of packet queues. In some embodiments (see e.g., FIG. 6), step 812 is not performed. After step 812, process 800 may proceed to steps 814, 820, 824 and 828 in parallel.

In step 814, PRPU 202 receives a packet. In step 814, PRPU 202 may also receive meta-data associated with the packet. In step 816, PRPU 202 determines the packet flow to which the packet belongs. As discussed above, PRPU 202 may determine the packet flow using data contained in the packet (e.g., a destination address) and/or the meta-data, which may identify one or more VLANs to which the packet is destined. In step 818, PRPU 202 places the received packet in the packet queue associated with the determined packet flow. For example, in step 818 PRPU may use the determined packet flow (e.g., determined VLAN identifiers) to look up in database 204 that packet queue that is assigned to the determined packet flow. PRPU 202 may perform steps 814-818 continuously.

In step 820, the first scheduling engine selects a packet queue from the first set of packet queues. For example, in step 820 the first scheduling engine may traverse a scheduling tree to arrive at a leaf scheduling node of the tree and, thereby, select the packet queue associated with the leaf scheduling node. In step 822, the first scheduling engine moves a packet from the selected packet queue to a first intermediate packet queue (e.g., iq1). The first scheduling engine may perform steps 820-822 continuously.

In some embodiments, the first scheduling engine periodically monitors the state of the first intermediate packet queue (e.g., periodically determines the length of the packet queue), and, depending on the state of the packet queue, may cease performing steps 802-822 for a short period of time (i.e., the first scheduling engine may pause). For example, if the first scheduling engine determines that the length of the first intermediate packet queue is greater than a predetermined threshold, then first scheduling engine, in response to that determination, may pause for some amount of time or temporarily selectively schedule only packets that are bound for other intermediate queues that are not full, thereby preventing the first intermediate packet queue from growing to large. This feature provides the advantages of: (i) bounding the amount of system resources (e.g., packet buffers) consumed by the intermediate queues, (ii) bounding the additional forwarding latency that could be incurred while a packet is waiting in an intermediate queue, and (iii) ensuring rules associated with the virtual port scheduling engines ultimately determine scheduling behavior.

In step 824, the second scheduling engine selects a packet queue from the second set of packet queues. For example, in step 824 the second scheduling engine may traverse a scheduling tree to arrive at a leaf scheduling node of the tree and, thereby, select the packet queue associated with the leaf scheduling node. In step 826, the second scheduling engine moves a packet from the selected packet queue to a second intermediate packet queue (e.g., iq2). The second scheduling engine may perform steps 824-826 continuously and independently of the first scheduling engine. Like the first scheduling engine, the second scheduling engine may periodically monitor the state of the second intermediate packet queue, and may be configured to pause depending on the state of the packet queue.

In step 828, the third scheduling engine selects a packet queue from a set of packet queues that includes the first and second intermediate packet queues and the third set of packet queues. In step 830, the third scheduling engine moves a packet from the selected packet queue to the transmit queue 214. The third scheduling engine may perform steps 828-830 continuously and independently of the first scheduling engine and the second scheduling engine. Like the first and second scheduling engines, the third scheduling engine may periodically monitor the state of transmit queue 214, and may be configured to pause depending on the state of the packet queue.

In the above manner, multiple, independent scheduling engines are employed to move packets to the transmit queue, thereby increasing the throughput of network interface 191.

Referring back to FIG. 2, as shown in FIG. 2, network element 108 may include a configuration module 208. Configuration module 208 may be configured to enable a user (e.g., a network administrator) to define a scheduling node, create scheduling trees, and assign scheduling nodes and/or scheduling trees to scheduling engines. For example, configuration module may provide a command-line interface (CLI) or a graphical-user interface (GUI) that enables the network administrator to configure network interface 191. Additionally, configuration module 208 may be configured to automatically configure network interface 191 (e.g., create a set of scheduling trees (e.g., trees 401-403) from a predefined scheduling tree (e.g., tree 300)). In some embodiments, configuration module 208 is configured to examine information defining a scheduling tree (e.g., tree 300), assign to a first scheduling engine a first sub-tree (e.g., tree 401) of the scheduling tree 300, and assign to a second scheduling engine a second, different sub-tree (e.g., tree 402) of the scheduling tree 300.

Figure 9:
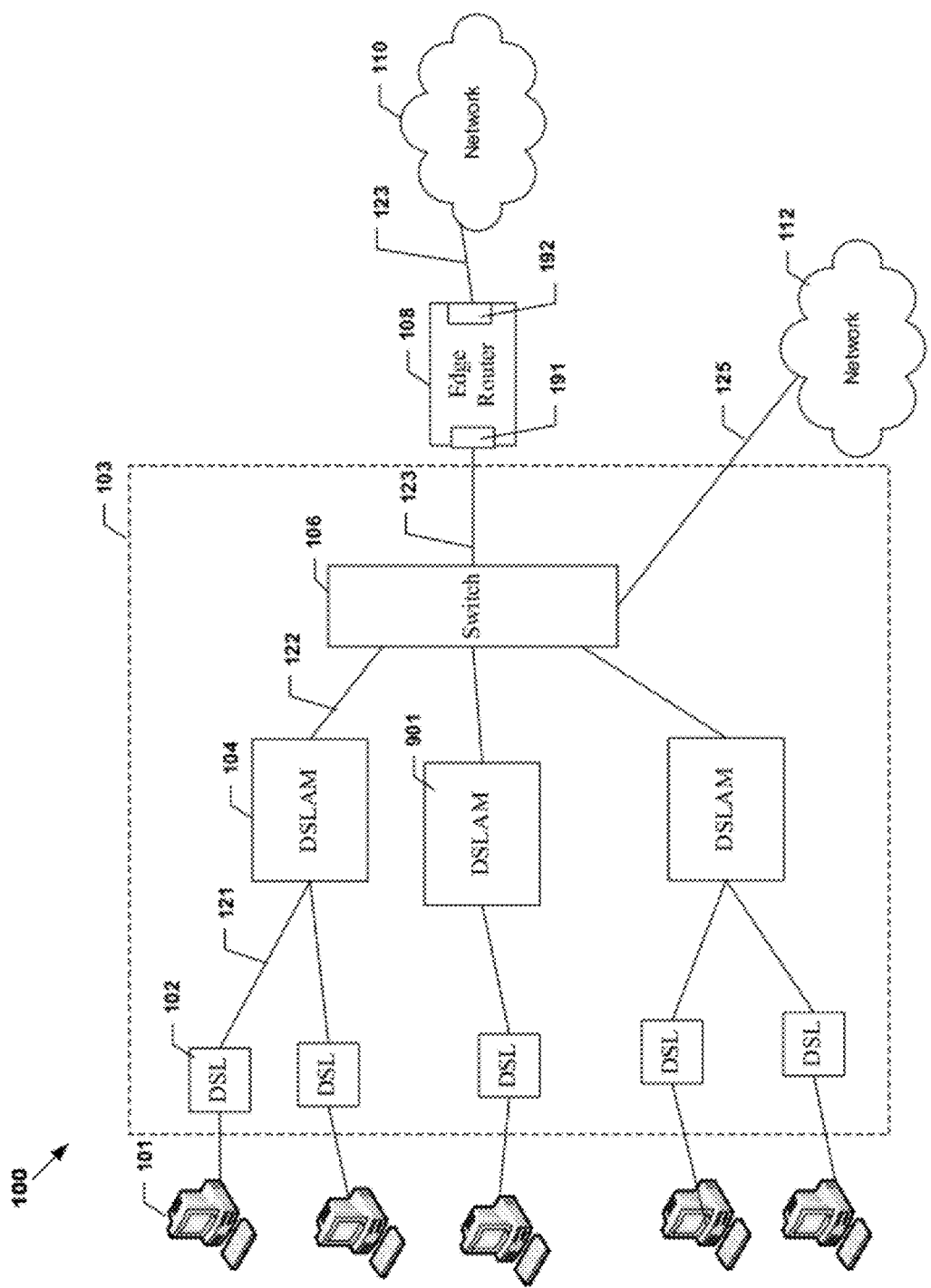
FIG. 9 illustrates a communication system.
Figure 10:
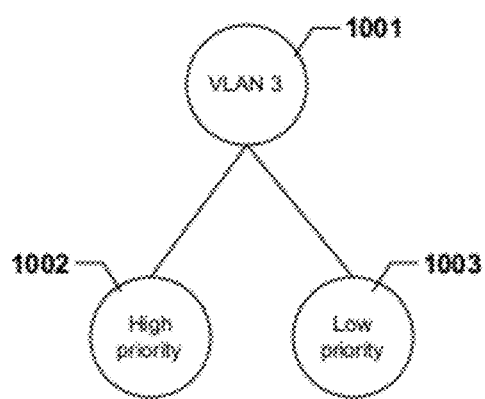
FIG. 10 illustrates a hierarchically arranged set of scheduling nodes.

As a specific example, assume that a new DSLAM 901 (see FIG. 9) has been added to communication system 100. When this new DSLAM 901 is added, a network administrator may use configuration module 208 to define new scheduling nodes to represent the flow of packets to DSLAM 901 (e.g., all packets destined for VLAN 3). For example, as shown in FIG. 10, the network administrator may define three new scheduling nodes: (1) an aggregate scheduling node 1001 representing the flow of all packets destined for VLAN 3, (2) a leaf scheduling node 1002 representing the flow of all high-priority packets (e.g., voice packets) to VLAN 3, and (3) a leaf scheduling node 1003 representing the flow of all low-priority packets to VLAN 3. Because aggregate scheduling node 1001 has more than one child scheduling node, the process of defining scheduling node 1001 may include associating scheduling node 1001 with a scheduling algorithm (e.g., round-robin) that a scheduling engine will use when the engine has reached scheduling node 1001 and has to select which child scheduling node to select. Additionally, if DSLAM 901 has a maximum packet forwarding capacity of 8 Gbps, the network administrator may further use configuration module to configure scheduling node 1001 such that it is associated with a maximum bandwidth of 8 Gbps.

After the scheduling nodes are defined, the packet flow represented by the leaf scheduling nodes need to be associated with a unique packet queue. Configuration module 208 may perform this function by updating packet flow to packet queue database 204 by adding to database 204, for each leaf scheduling node, information mapping the packet flow defined by the leaf scheduling node with a packet queue.

Additionally, after the scheduling nodes are defined, one or more of the scheduling trees that are currently being used by scheduling system 212 need to be modified to accommodate the leaf scheduling nodes 1002 and 1003 and/or a new scheduling tree needs to be created. This can be done manually by the network administrator or automatically by configuration module 208.

Figure 11:
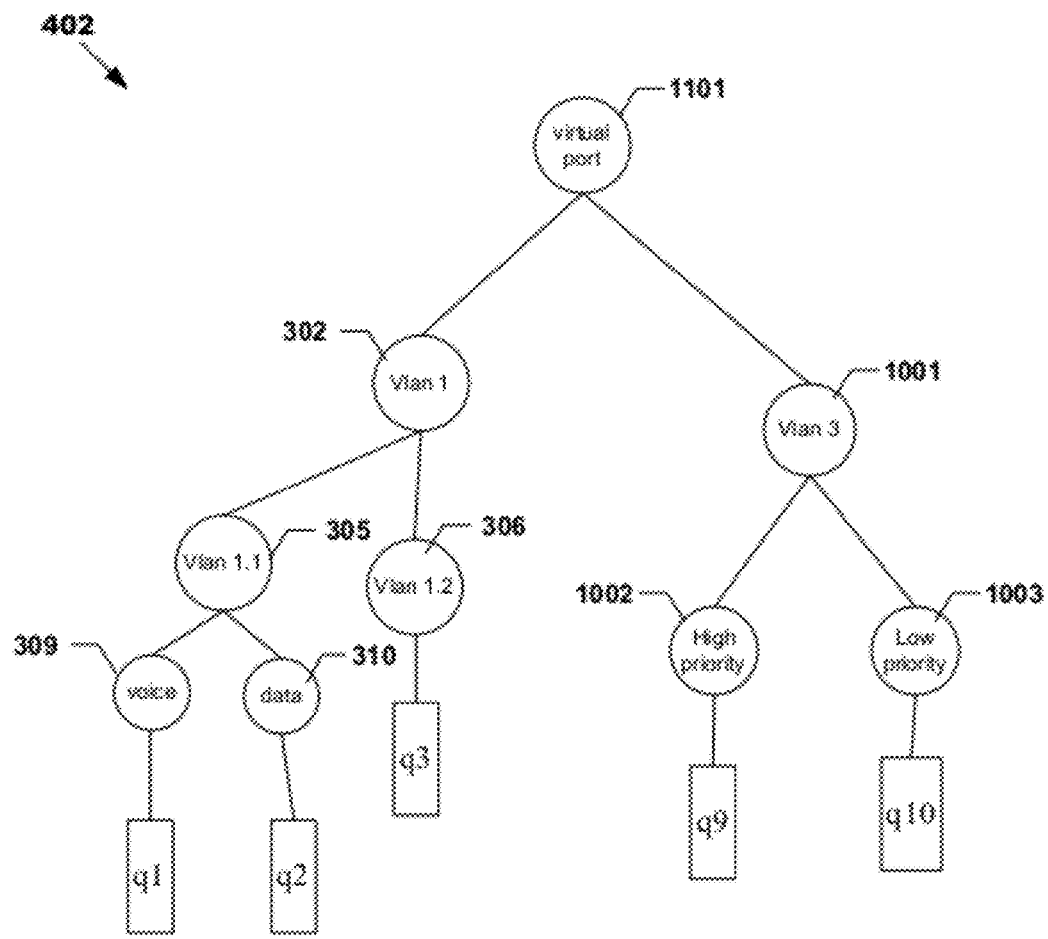
FIG. 11 illustrates a modified scheduling tree.
Figure 12:
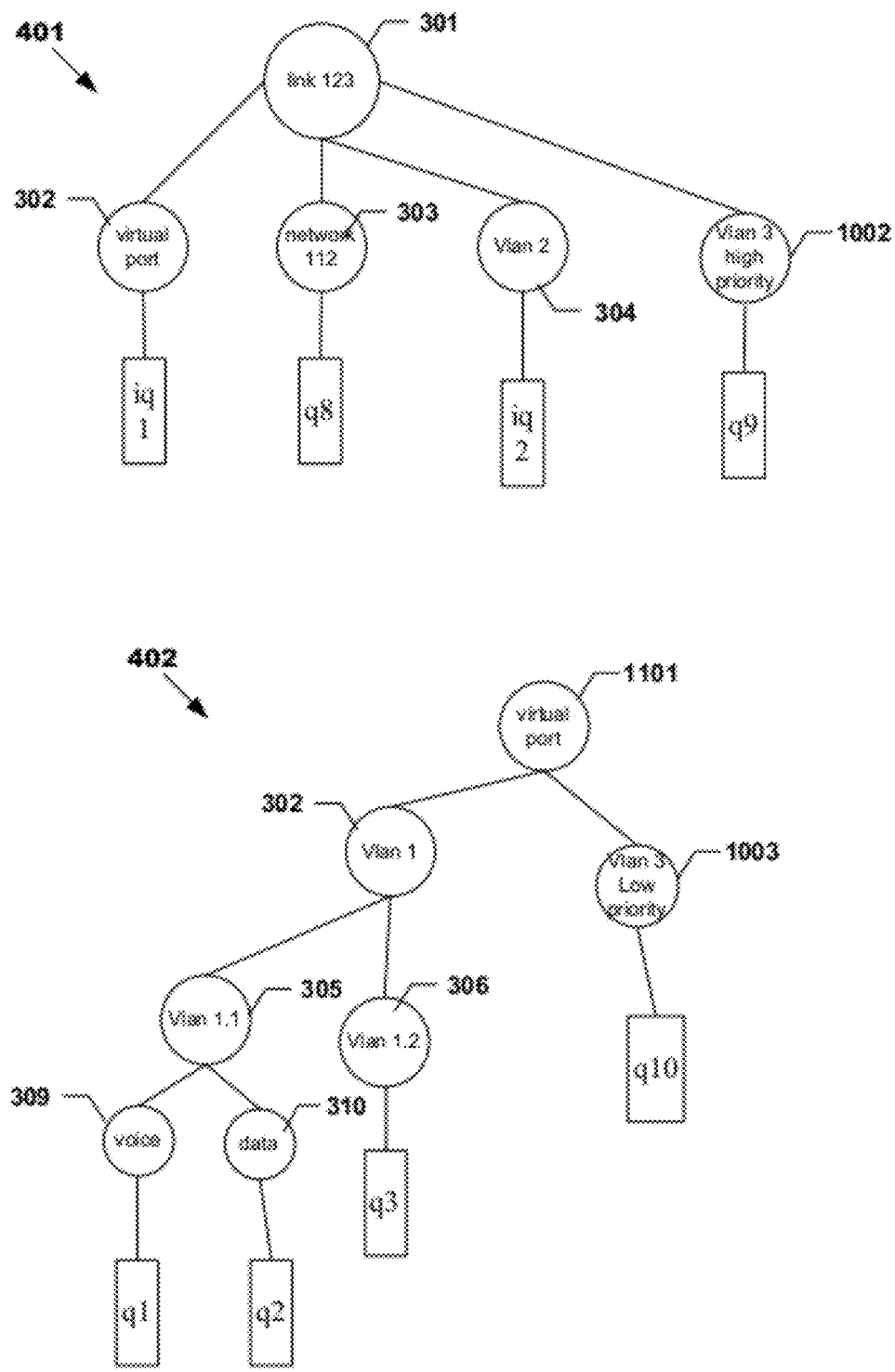
FIG. 12 illustrates two modified scheduling trees.

As an example, FIG. 11 shows how tree 402 may be modified to accommodate leaf scheduling nodes 1002 and 1003, which, as shown, have been associated with packet queues q9 and q10, respectively. As shown in FIG. 11, a virtual port scheduling node 1101 has been created to be the new root scheduling node of tree 402. It was required to create virtual port scheduling node 1101 and make it the root scheduling node of tree 402 because scheduling node 302, which was the root scheduling node of tree 402, and scheduling node 1001 represent distinct packet flows, and therefore, scheduling node 1001 could not be a child of scheduling node 302 and vice-versa. As shown, scheduling node 302 is now directly connected to scheduling node 1101, and leaf scheduling nodes 1002 and 1003 are indirectly connected to root scheduling node 1101 via aggregate scheduling node 1001, which is directly connected to root scheduling node 1101. FIG. 12 shows another way that leaf scheduling nodes 1002 and 1003 can be added to a scheduling tree. As shown in FIG. 12, trees 401 and 402 were modified to accommodate leaf scheduling nodes 1002 and 1003, respectively.

In embodiments where configuration module 208 automatically reconfigures the scheduling trees, configuration module 208 may be programmed to take into account scheduling engine bandwidth and the maximum bandwidths associated with scheduling nodes. For example, if we assume that (a) the maximum bandwidth of scheduling engine 522 is 15 Gbps, (b) the maximum bandwidth associated with scheduling node 302 is 10 Gbps, and (c) the maximum bandwidth associated with scheduling node 1001 is also 10 Gbps, then configuration module 208 would not add leaf scheduling nodes 1002 and 1003 to tree 402, as shown in FIG. 11, because the sum of (i) the maximum bandwidth associated with scheduling node 302 and (ii) the maximum bandwidth associated with scheduling node 1001 is greater than the maximum bandwidth of scheduling engine 522. Also, in embodiments where a new scheduling tree may be added to an existing set of scheduling trees, configuration module 208 may automatically instantiate a new virtual port scheduling engine to schedule the packet flows associated with the new scheduling tree.

Figure 13:
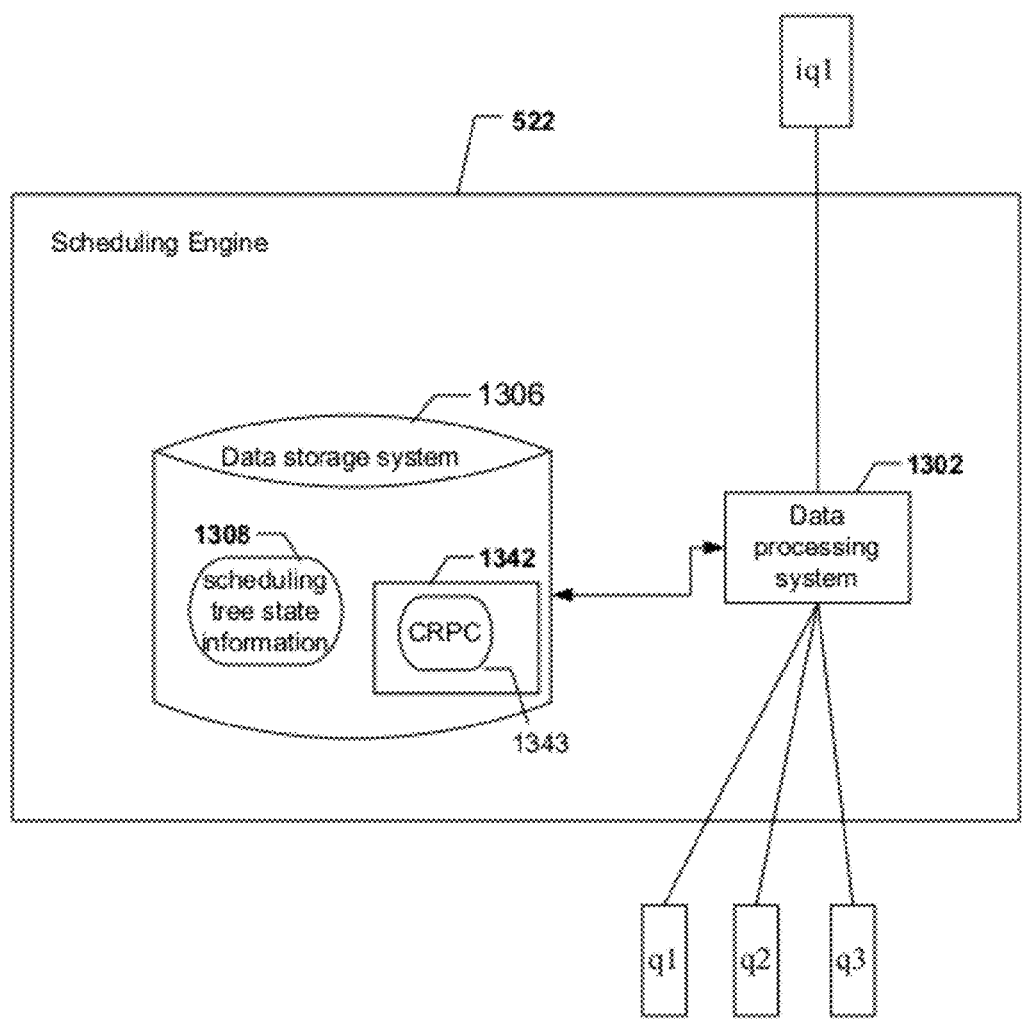
FIG. 13 is a block diagram of a scheduling engine according to some embodiments.

Referring now to FIG. 13, FIG. 13 illustrates a block diagram of scheduling engine 522 according to some embodiments of the invention. As shown in FIG. 13, scheduling engine 522 may include: a data processing system 1302, which may include one or more microprocessors and/or one or more circuits, such as an application specific integrated circuit (ASIC), Field-programmable gate arrays (FPGAs), etc; a network interface 1304; and a data storage system 1306, which may include one or more non-volatile storage devices and/or one or more volatile storage devices (e.g., random access memory (RAM)). As shown, data storage system 1306 may be used to store scheduling tree state information. In embodiments where data processing system 1302 includes a microprocessor, computer readable program code 1343 may be stored in a computer readable medium 1342, such as, but not limited, to magnetic media (e.g., a hard disk), optical media (e.g., a DVD), memory devices (e.g., random access memory), etc. In some embodiments, computer readable program code 1343 is configured such that when executed by a processor, code 1343 causes scheduling engine 522 to perform steps described above (e.g., steps describe above with reference to the flow chart shown in FIG. 8). In other embodiments, scheduling engine 522 is configured to perform steps described above without the need for code 1343. That is, for example, data processing system 1302 may consist merely of one or more ASICs. Hence, the features of the present invention described above may be implemented in hardware and/or software. For example, in particular embodiments, the functional components of scheduling engine 522 described above may be implemented by data processing system 1302 executing computer instructions 1343, by data processing system 1302 operating independent of any computer instructions 1343, or by any suitable combination of hardware and/or software.

Figure 14:
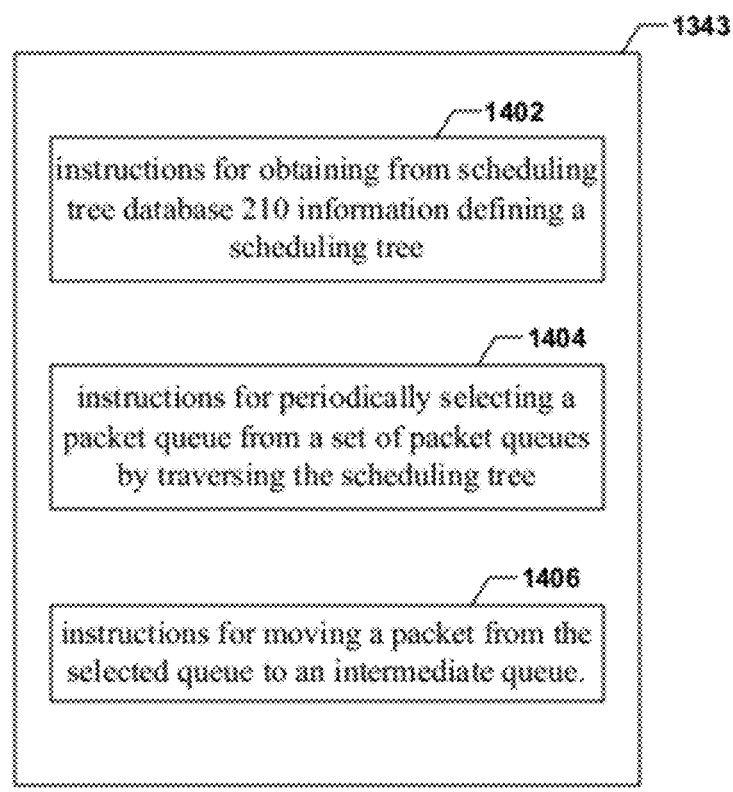
FIG. 14 is a block diagram illustrating example software components of a scheduling engine.

Referring now to FIG. 14, FIG. 14 illustrates an embodiment of computer readable program code (CRPC) 1343. In the embodiment shown, CRPC 1343 includes: (1) a set of instructions 1402 for obtaining from scheduling tree database 210 information defining a scheduling tree, (2) a set of instructions 1404 for periodically selecting a packet queue from a set of packet queues by traversing the scheduling tree, and (3) a set of instructions 1406 for moving a packet from the selected packet queue to an intermediate packet queue.

While various embodiments of the present invention have been described above, it should be understood that they have been presented by way of example only, and not limitation. Thus, the breadth and scope of the present invention should not be limited by any of the above-described exemplary embodiments. Moreover, any combination of the above-described elements in all possible variations thereof is encompassed by the invention unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

What is claimed is:
1. A packet scheduling apparatus, comprising:
a first scheduling engine operable to (a) select a packet queue from a first set of packet queues and (b) move a packet from the selected packet queue to an intermediate packet queue included in a first set of intermediate packet queues, wherein the first scheduling engine is configured to perform the packet queue selection using information corresponding to a first set of scheduling nodes;

a second scheduling engine operable to (a) select a packet queue from a second set of packet queues and (b) move a packet from the selected packet queue to an intermediate packet queue included in a second set of intermediate packet queues, wherein the second scheduling engine is configured to perform the packet queue selection using information corresponding to a second set of scheduling nodes;

a third scheduling engine operable to (a) select a packet queue from a set of packet queues comprising the first set of intermediate packet queues and the second set of intermediate packet queues and (b) move a packet from the selected packet queue to a transmit queue;

a packet transmitter configured to transmit on to a communications link packets from the transmit queue, wherein the first scheduling engine and the second scheduling engine are configured to select packet queues independently of each other such that state information need not be shared between the first and second scheduling engines.

2. The packet scheduling apparatus of claim 1, wherein the first and second scheduling engines are software based scheduling engines and the third scheduling engine is a pure hardware based scheduling engine that is implemented as logic in an application specific integrated circuit (ASIC).

3. The packet scheduling apparatus of claim 1, wherein
a set of packet queues included in the first set of packet queues is associated with a first packet flow,
a set of packet queues included in the second set of packet queues is associated with a second packet flow, and
the packet scheduling apparatus further includes a packet receiving and processing unit (PRPU) configured to (a) receive a packet, (b) determine a packet flow to which the packet belongs, and (c) place the packet in a packet queue associated with the packet flow.

4. The packet scheduling apparatus of claim 3, wherein
the third scheduling engine is operable to select a packet queue from a set of packet queues comprising the first set of intermediate packet queues, the second set of intermediate packet queues, and a third set of packet queues,
a set of packet queues included in the third set of packet queues is associated with a third packet flow, and
the PRPU is configured such that (a) when the PRPU receives a packet and determines that the packet belongs to the first packet flow, the PRPU places the packet in one of the packet queues included in the set of packet queues that is associated with the first packet flow, (b) when the PRPU receives a packet and determines that the packet belongs to the second packet flow, the PRPU places the packet in one of the packet queues included in the set of packet queues that is associated with the second packet flow, and (c) when the PRPU receives a packet and determines that the packet belongs to the third packet flow, the PRPU places the packet in one of the packet queues included in the set of packet queues that is associated with the third packet flow.

5. The packet scheduling apparatus of claim 1, wherein the first set of scheduling nodes includes scheduling nodes from a first sub-tree of a scheduling tree and the second set of scheduling nodes comprises scheduling nodes from a second, different sub-tree of the scheduling tree.

6. The packet scheduling apparatus of claim 5, further comprising:

a configuration module configured to examine information defining the scheduling tree, assign to the first scheduling engine a first sub-tree of the scheduling tree, and assign to the second scheduling engine a second, different sub-tree of the scheduling tree.

7. The packet scheduling apparatus of claim 1, wherein the first set of scheduling nodes includes a set of scheduling nodes that are also included in the second set of scheduling nodes.

8. The packet scheduling apparatus of claim 1, wherein
the information corresponding to the first set of scheduling nodes comprises: (a) first maximum data rate information associated with one of the scheduling nodes included in the first set of scheduling nodes and (b) information identifying a first scheduling algorithm, and
the information corresponding to the second set of scheduling nodes comprises: (a) second maximum data rate information associated with one of the scheduling nodes included in the second set of scheduling nodes and (b) information identifying a second scheduling algorithm.

9. The packet scheduling apparatus of claim 8, wherein
the first scheduling engine is configured to select a packet queue from which to remove a packet using the first maximum data rate information and the first scheduling algorithm, and
the second scheduling engine is configured to select a packet queue from which to remove a packet using the second maximum data rate information and the second scheduling algorithm.

10. The packet scheduling apparatus of claim 1, wherein the first scheduling engine comprises:
a data processing system; and
a non-transitory computer readable medium accessible to the data processing system, the non-transitory computer readable medium storing computer readable program code that when executed by the data processing system cause the data processing system to (a) select a packet queue from the first set of packet queues and (b) move a packet from the selected packet queue to an intermediate packet queue included in the first set of intermediate packet queues.

11. The packet scheduling apparatus of claim 1, wherein the packet scheduling apparatus is implemented in a network interface of a switch or router.

12. A packet scheduling method, the method comprising:
assigning a first set of packet queues to a first scheduling engine;
assigning a second set of packet queues to a second scheduling engine;
assigning a first packet flow to a set of packet queues included in the first set of packet queues;
assigning a second packet flow to a set of packet queues included in the second set of packet queues;
receiving, at a network interface of a network element, a packet;
determining a packet flow to which the packet belongs;
if the received packet belongs to the first packet flow, then placing the received packet in one of the packet queues included in the set of packet queues to which the first packet flow is assigned in response to determining that the received packet belongs to the first packet flow; and
if the received packet belongs to the second packet flow, then placing the received packet in one of the packet queues included in the set of packet queues to which the second packet flow is assigned in response to determining that the received packet belongs to the second packet flow, wherein the first scheduling engine (a) selects a packet queue from the first set of packet queues and (b) moves a packet from the selected packet queue to an intermediate packet queue included in a first set of intermediate packet queues, the second scheduling engine (a) selects a packet queue from the second set of packet queues and (b) moves a packet from the selected packet queue to an intermediate packet queue included in a second set of intermediate packet queues, a third scheduling engine (a) selects a packet queue from a set of packet queues comprising the first set of intermediate packet queues and the second set of intermediate packet queues and (b) moves a packet from the selected packet queue to a transmit queue, and a packet transmitter of the network interface transmits on to a communications link packets from the transmit queue.

13. The method of claim 12, wherein the first scheduling engine and the second scheduling engine are configured to select packet queues independently of each other such that state information need not be shared between the first and second scheduling engines.

14. The method of claim 12, wherein
the first scheduling engine performs the packet queue selection using information corresponding to a first scheduling tree comprising a first set of hierarchically arranged scheduling nodes, and
the second scheduling engine is configured to perform the packet queue selection using information corresponding to a second scheduling tree comprising a second set of hierarchically arranged scheduling nodes.

15. The method of claim 14, wherein the first set of scheduling nodes includes scheduling nodes from a first sub-tree of a scheduling tree and the second set of scheduling nodes comprises scheduling nodes from a second, different sub-tree of the scheduling tree.

16. The method of claim 14, wherein
the information corresponding to the first set of scheduling nodes comprises: (a) first maximum data rate information associated with one of the scheduling nodes included in the first set of scheduling nodes and (b) a first scheduling algorithm, and
the information corresponding to the second set of scheduling nodes comprises: (a) second maximum data rate information associated with one of the scheduling nodes included in the second set of scheduling nodes and (b) a second scheduling algorithm.

17. The method of claim 16, wherein
the first scheduling engine is configured to select a packet queue from which to remove a packet using the first maximum data rate information and the first scheduling algorithm, and
the second scheduling engine is configured to select a packet queue from which to remove a packet using the second maximum data rate information and the second scheduling algorithm.

18. The method of claim 12, wherein the first and second scheduling engines are software based scheduling engines and the third scheduling engine is a pure hardware based scheduling engine.

19. The method of claim 18, wherein the first and second scheduling engines are implemented using assembly code and the third scheduling engine is implemented as logic in an application specific integrated circuit (ASIC).

20. The method of claim 12, wherein
the third scheduling engine select a packet queue from a set of packet queues comprising the first set of intermediate packet queues, the second set of intermediate packet queues, and a third set of packet queues,
a third packet flow is assigned to a set of packet queues included in the third set of packet queues, and
the method further comprises placing the received packet in one of the packet queues included in the set of packet queues to which the third packet flow is assigned in response to determining that the received packet belongs to the third packet flow.

21. The method of claim 12, further comprising:
assigning a third packet flow to (i) a set of packet queues included in the first set of packet queues and (ii) a set of packet queues included in the second set of packet queues; and
if the received packet belongs to the third packet flow, then, using a load balancer, place the received packet in one of the packet queues to which the third packet flow is assigned.

* * * * *

UNITED STATES PATENT AND TRADEMARK OFFICE
CERTIFICATE OF CORRECTION

PATENT NO.         : 8,705,363 B2                                        Page 1 of 1
APPLICATION NO.    : 13/080574
DATED              : April 22, 2014
INVENTOR(S)        : Lynch et al.

It is certified that error appears in the above-identified patent and that said Letters Patent is hereby corrected as shown below:

On the Title Page, Item (56), under "OTHER PUBLICATIONS", in Column 2, Line 1,
delete ""Hierarchica1" and insert -- "Hierarchical --, therefor.

In the Specification

In Column 6, Line 50, delete "scheduling system 300." and insert -- scheduling system 212. --, therefor.

In Column 10, Line 51, delete "q8b." and insert -- q9b. --, therefor.

Signed and Sealed this
Ninth Day of September, 2014

Michelle K. Lee
*Deputy Director of the United States Patent and Trademark Office*